United States Patent
Wolf et al.

(10) Patent No.: US 11,080,276 B2
(45) Date of Patent: Aug. 3, 2021

(54) OPTIMAL RANGES FOR RELATIONAL QUERY EXECUTION PLANS

(71) Applicant: SAP SE, Walldorf (DE)

(72) Inventors: Florian Wolf, Ilmenau (DE); Norman May, Karlsruhe (DE); Paul Willems, Heidelberg (DE); Kai-Uwe Sattler, Ilmenau (DE)

(73) Assignee: SAP SE, Walldorf (DE)

( * ) Notice: Subject to any disclaimer, the term of this patent is extended or adjusted under 35 U.S.C. 154(b) by 478 days.

(21) Appl. No.: 15/904,192

(22) Filed: Feb. 23, 2018

(65) Prior Publication Data

US 2019/0266272 A1 Aug. 29, 2019

(51) Int. Cl.
*G06F 16/2453* (2019.01)

(52) U.S. Cl.
CPC .. *G06F 16/24542* (2019.01); *G06F 16/24549* (2019.01)

(58) Field of Classification Search
CPC ......... G06F 16/24542; G06F 16/24549; G06F 16/24534
See application file for complete search history.

(56) References Cited

U.S. PATENT DOCUMENTS

| | | | | |
|---|---|---|---|---|
| 6,865,567 B1 * | 3/2005 | Oommen | ............ | G06F 16/2462 |
| 8,185,519 B2 * | 5/2012 | Chaudhuri | ........ | G06F 16/24542 |
| | | | | 707/714 |
| 9,886,492 B2 * | 2/2018 | Brobst | .................. | G06F 16/284 |
| 10,534,775 B2 * | 1/2020 | Moerkotte | ........ | G06F 16/24545 |
| 10,872,086 B2 * | 12/2020 | Moerkotte | .......... | G06F 16/2455 |
| 2004/0010488 A1 * | 1/2004 | Chaudhuri | .......... | G06F 16/2462 |
| 2004/0126762 A1 * | 7/2004 | Morris | ............... | G01N 33/5748 |
| | | | | 435/6.16 |
| 2005/0071331 A1 * | 3/2005 | Gao | .................. | G06F 16/24547 |
| 2005/0097078 A1 * | 5/2005 | Lohman | ............ | G06F 16/90335 |
| 2005/0177557 A1 * | 8/2005 | Ziauddin | ................ | G06F 16/217 |
| 2007/0226186 A1 * | 9/2007 | Ewen | ................ | G06F 16/24542 |
| 2008/0177722 A1 | 7/2008 | Lohman et al. | | |
| 2008/0215531 A1 * | 9/2008 | Markl | ................ | G06F 16/24542 |
| 2009/0070313 A1 * | 3/2009 | Beyer | ..................... | G06F 16/24 |

(Continued)

OTHER PUBLICATIONS

Babu, Shivnath, et al.,"Proactive re-optimization." Proceedings of the 2005 ACM SIGMOD international conference on Management of data. ACM, 2005 (12 pages).

(Continued)

*Primary Examiner* — Robert W Beausoliel, Jr.
*Assistant Examiner* — Susan F Rayyan
(74) *Attorney, Agent, or Firm* — Mintz Levin Cohn Ferris Glovsky and Popeo, P.C.

(57) ABSTRACT

In some implementations, there is provided an apparatus having at least one data processor and at least one memory storing instructions which, when executed by the at least one data processor, cause executing at least a portion of a query execution plan; determining, at an edge including an intermediate result, a cardinality; proceeding with the execution of the query execution plan, when the determined cardinality is within an optimality range associated with the edge; and selecting an alternative query execution plan for execution, when the determined cardinality is outside the optimality range associated with the edge. Related systems and articles of manufacture are also provided.

20 Claims, 7 Drawing Sheets

(56) References Cited

U.S. PATENT DOCUMENTS

| | | | |
|---|---|---|---|
| 2009/0094191 | A1 | 4/2009 | Chaudhuri et al. |
| 2009/0271360 | A1* | 10/2009 | Bestgen ............ G06F 16/24542 |
| 2009/0327242 | A1* | 12/2009 | Brown ............. G06F 16/24549 |
| 2010/0198807 | A1* | 8/2010 | Kuno ................ G06F 16/24542 |
| | | | 707/713 |
| 2010/0198810 | A1* | 8/2010 | Graefe ............. G06F 16/24542 |
| | | | 707/718 |
| 2010/0198811 | A1* | 8/2010 | Wiener ............ G06F 16/24549 |
| | | | 707/718 |
| 2014/0095472 | A1* | 4/2014 | Lee .................. G06F 16/24542 |
| | | | 707/714 |
| 2016/0353375 | A1* | 12/2016 | Shapley ............ H04W 52/0206 |

OTHER PUBLICATIONS

Bizarro, Pedro, et al., "Progressive parametric query optimization." IEEE Transactions on Knowledge and Data Engineering 21.4, Apr. 2009: (13 pages).

Harish, D., Pooja N. Darera, and Jayant R. Haritsa. "Identifying robust plans through plan diagram reduction." Proceedings of the VLDB Endowment 1.1 (2008): (17 pages).

Harish, D., Pooja N., and Jayant R. Haritsa. "On the production of anorexic plan diagrams." Proceedings of the 33rd international conference on Very large data bases. VLDB Endowment, 2007 (12 pages).

Hulgeri, Arvind, and S. Sudarshan. "Parametric query optimization for linear and piecewise linear cost functions." VLDB'02: Proceedings of the 28th International Conference on Very Large Databases. 2002. (12 pages).

Kabra, Navin, and David J. DeWitt. "Efficient mid-query re-optimization of sub-optimal query execution plans." ACM SIGMOD Record. vol. 27. No. 2. ACM, 1998. (12 pages).

Kemper, Alfons, and Thomas Neumann. "HyPer: A hybrid OLTP &OLAP main memory database system based on virtual memory snapshots." Data Engineering (ICDE), 2011 IEEE 27th International Conference on. IEEE, 2011: 195-206 pp.

Liu, Mengmeng, et al., "Enabling incremental query re-optimization." *Proceedings of the 2016 International Conference on Management of Data*. ACM, 2016: 1705-1720 pp.

Markl Volker, et al. "Robust query processing through progressive optimization." Proceedings of the 2004 ACM SIGMOD international conference on Management of data. ACM, 2004. (12 pages).

May, Norman, Alexander Böhm, and Wolfgang Lehner. "SAP HANA—The Evolution of an In-Memory DBMS from Pure OLAP Processing Towards Mixed Workloads." Datenbanksysteme für Business, Technologie und Web (BTW 2017) (2017). (19 pages).

Ono, Kiyoshi, and Guy M. Lohman. "Measuring the Complexity of Join Enumeration in Query Optimization." VLDB. vol. 97. 1990: 314-325 pp.

Psaroudakis, Iraklis, et al. "Scaling up mixed workloads: a battle of data freshness, flexibility, and scheduling." Technology Conference on Performance Evaluation and Benchmarking. Springer, Cham, 2014. (16 pages).

Selinger, P. Griffiths, et al., "Access path selection in a relational database management system." Readings in Artificial Intelligence and Databases. 1988. (12 pages).

Stillger, Michael, et al. "LEO-DB2's learning optimizer." VLDB. vol. 1. 2001. (10 pages).

Transaction Processing Performance Council, "TPC Benchmark H (Decision Support) Standard Specification Revision 2.17.2," Apr. 2017. http://www.tpc.org. (136 pages).

Yin, Shaoyi, et al., "Robust query optimization methods with respect to estimation errors: A survey." ACM SIGMOD Record 44.3 (2015): 25-36 pp.

* cited by examiner

OPTIMAL RANGES FOR RELATIONAL QUERY EXECUTION PLANS

TECHNICAL FIELD

The subject matter described herein relates generally to databases and, in particular, query plan optimization.

BACKGROUND

Accessing data at a database can be a complex sequence of operations. These operations can be optimized to at least reduce execution time of the query access for the data. To that end, a query plan can be generated to determine an optimal sequence of operations to perform the data access at the database. In the case of a relational database for example, there can be a variety of ways to execute a query at the database. The query optimizer can receive a query to be executed at the database. The query optimizer may determine an "optimum" way to execute the received query at the database so that the response time is reduced.

SUMMARY

In some implementations, there is provided an apparatus having at least one data processor and at least one memory storing instructions which, when executed by the at least one data processor, cause executing at least a portion of a query execution plan; determining, at an edge including an intermediate result, a cardinality; proceeding with the execution of the query execution plan, when the determined cardinality is within an optimality range associated with the edge; and selecting an alternative query execution plan for execution, when the determined cardinality is outside the optimality range associated with the edge.

In some variations, one or more features disclosed herein including the following features can optionally be included in any feasible combination. The query optimizer may receive a query from an application and determine the query execution plan for execution at a database. The optimality range associated with the edge may be determined before execution. The optimality range may include a lower cardinality bound and a higher cardinality bound. The lower cardinality bound and the higher cardinality bound may form a range, within which query execution plan remains optimal. The lower cardinality bound may be mapped to the first alternative query execution plan and the higher cardinality bound may be mapped to the second alternative query execution plan. When the determined cardinality is less than the lower cardinality bound, the query optimizer may select the first alternative query execution plan for execution as an optimal plan, and wherein when the determined cardinality is higher than the higher cardinality bound, the query optimizer selects the second alternative query execution plan for execution as the optimal plan. The determined cardinality may represent the actual cardinality obtained from execution. The optimality range is determined based on parametric cost functions. The optimality range and the alternative query execution plan may be cached in a table. The determining may further comprise calculating a plurality of query execution plans. The plurality of optimality ranges are determined for a corresponding plurality of edges of the query execution plan.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
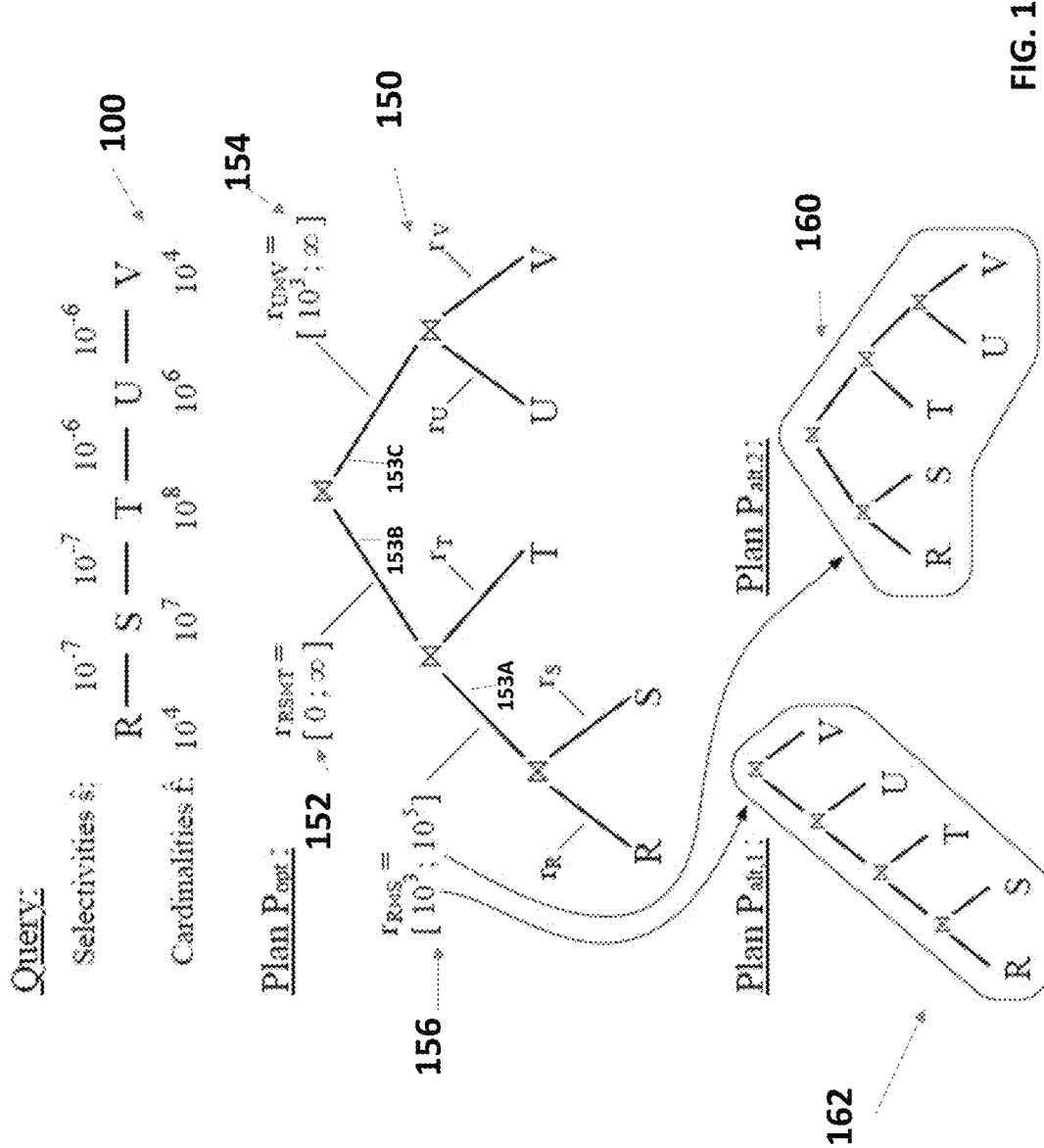
FIG. 1 depicts examples of query execution plans.

Query optimization can lead to faster execution times of a query on a database, especially in the case of a complex database task. Often, cardinality estimation may be performed as part of the query optimization. For example, cardinality estimation may estimate a quantity of rows returned as an intermediate result for a query operation, such as a join, table scan, and/or the like. At query execution time however, estimation errors may result in actual intermediate result sizes differing from the initial query optimization's estimated result sizes, in which case the original query optimization's execution plan may no longer be truly "optimal."

In some implementations, the query optimizer may analyze the deviation(s) from the estimate and actual runtime results. In some implementations, the query optimizer may determine and/or assign a cardinality range (where the optimal plan for some intermediate result remains optimal) as the "optimality range" for the query execution plan. For a given query (or portion of a query), the query optimizer may generate precise cardinality range bounds for the optimality range considering relevant plan alternatives.

Database management systems including more complex hybrid transactional analytical processing (HTAP) systems, may encounter challenges with respect to query processing. To illustrate by way of example, while a traditional data warehouse system may be able to cache some plans for all executions of a statement between data load processes, this strategy may not always be possible with more complex systems, such as HTAP. Constant updates/changes over time at the database may make a query execution plan at some point "sub-optimal, while in some instances a single row update at a database may cause a query execution plan to be considered "sub-optimal" as well.

In some implementations, the query optimizer may determine when a cached query execution plan becomes, from a cost perspective, sub-optimal, which may trigger a search and selection of another, alternative optimum query plan.

In some implementations, the query optimizer may determine for the query execution plan optimality ranges for intermediate result cardinalities, And, the query optimizer may annotate for the query execution plan optimality ranges for intermediate result cardinalities.

For example, each "edge" of the query execution plan may connect two operators of the query execution plan, wherein the operators produce an intermediate result. For example, query plan may include a join of table R and table S yielding an intermediate result, which may be further operated on by other operators in the query plan. Thus, the edge represents a location where an intermediate result I is present, and this intermediate result has an estimated cardinality fl. In some implementation, the query optimizer may, as part of cost-based optimization, calculate for each edge in the query execution plan an optimality range, such as range $rl=[f_l^\downarrow:f_l^\uparrow]$, for the cardinality fl, wherein $0 \leq f_l^\downarrow \leq fl \leq f_l^\uparrow \leq \infty$.

Later when at least a portion of the query plan is executed, the actual cardinalities (determined as a result of execution of the portion) may have available intermediate results. If the actual cardinality falls outside of the pre-calculated, determined optimality range, the query optimizer may search and detect that there is another, cheaper query execution plan. This simple check at an edge may be much more efficient, when compared to a full re-optimization.

In the context of mid-query re-optimization, the pre-determined optimality ranges noted above may be used at execution time to (re)evaluate whether the query execution plan remains optimum or has become sub-optimal (e.g., a cheaper query execution plan is available). At execution time, the query optimizer may determine whether the current query execution plan should continue or whether another query execution plan should be searched for and switched to for execution. The pre-determined optimality ranges disclosed herein may be used in other applications, such as re-occurring parametric queries, an example of which is the progressive parametric query optimization.

FIG. 1 depicts an example of a chain query 100 joining five relations with estimated cardinalities $\hat{f}$ and estimated join selectivities ŝl. FIG. 1 also depicts an optimized plan, $P_{opt}$, 150 annotated with optimality ranges r, in accordance with some implementations. For example, the edge 153A depicts an annotation 156 of the cardinality of the operation of the join of tables R and S. Referring to 156, the cardinality of this join has a lower cardinality bound of $10^3$ and an upper cardinality bound of $10^5$ (as pre-calculated as part of the query execution optimization).

The optimized plan 150 may be considered a cost optimized plan in the sense that it is cost optimized with respect to execution time, memory usage, and/or the like.

In the optimized plan, $P_{opt}$, 150 some lower bounds are zero 152 while some of the upper bounds are unbounded 154 (e.g., very large if not infinite). A reason for this is that the quantity of possible alternative plans decreases as more sub-plans are executed. In an optimal plan $P_{opt}$ supposing a join of tables R and S is executed, the estimated result cardinality of R ⋈ S, $\hat{f}_{R\bowtie S}$ is $10^4$, and the optimality range on the outgoing edge of R ⋈ S, $r_{R\bowtie S}$ indicates that the optimal plan $P_{opt}$ is still optimal, when the cardinality $f_{R\bowtie S}$ of R join S is between $10^3$ and $10^5$ 156 When the cardinality $f_{R\bowtie S}$ exceeds the upper bound $f_{R\bowtie S}^\uparrow = 10^5$, the alternative plan $P_{alt,2}$ 160 becomes optimal plan. When the cardinality $f_{R\bowtie S}$ is below the lower bound $10^3$, the alternative plan $P_{alt,1}$ 165 becomes optimal plan. The query optimizer may thus use the lower and upper bounds during query plan execution to determine whether the current query execution plan remains optimal or is sub-optimal (in which case another query plan such as 160 and 162 may be selected for execution).

Although some of the examples depict specific values for the bounds, these values are merely examples for purposes of explanation as other values may be used as well. Moreover, the bound values may be represented in terms other than decimal powers.

In some implementations, the query optimizer may determine an optimality range based on a plan table (e.g., a data structure such as a memo structure, dynamic programming table, and/or other technique) created during query optimization. The plan table may include groups or query plan classes. Every group/plan class may represent a set of plans having the same logical properties (e.g., the same set of referenced tables).

Query optimization including cost-based optimization may include searching for different (e.g., alternative) query execution plans. The query optimizer may calculate, for the different plans, costs based on statistics, estimations, and/or a cost function. The query optimizer may then select, as the optimal plan, the query execution plan with the smallest cost. For example, the following cost function may be used to accumulate operator output cardinalities:

$$C_{out}(P) = \begin{cases} 0 & \text{if } P \text{ contains only a base table} \\ |P| + C_{out}(P_1) + C_{out}(P_2) & \text{if } P = P_1 \bowtie P_2 \end{cases} \quad (1)$$

although other types of cost functions may be used as well. Referring again to the query 150 at FIG. 1, for the $C_{out}$ cost function and given statistics, plan $P_{opt}$ 150 may have, for example, costs of $1.21*10^5$, and plan $P_{alt,2}$ 160 may have costs of $1.021*10^6$. For the estimated cardinalities, the query optimizer may select $P_{opt}$ over plan $P_{alt,2}$.

To detect when $P_{alt,2}$ has a lower cost than $P_{opt}$, the output cardinality of R ⋈ S (e.g., $f_{R\bowtie S}$ or $f_{R,S}$) is not $10^4$ but instead may be set initially (to enable optimization) as an arbitrary value. In other words, the query optimizer tries to determine whether there are any values $f_{RS}$ for which $P_{alt,2}$ has smaller costs than $P_{opt}$, and if so, for which values of $f_{RS}$. To that end, the costs of both plans $P_{opt}$ and $P_{alt,2}$ may be modeled as a function of $f_{RS}$ (that is not set at $f_{RS}=10^4$) but instead leave it as variable parameter when calculating the costs of $P_{opt}$ and $P_{alt,2}$ as shown in equations 2-11 below:

$$C_{out}(P_{opt}) = f_{RS} + f_{RST} + f_{UV} + f_{RSTUV} \quad (2)$$

$$f_{RST} = f_{RS} * 10^8 * 10^{-7} = 10 * f_{RS} \quad (3)$$

$$f_{UV} = 10^6 * 10^4 * 10^{-6} = 10^4 \quad (4)$$

$$f_{RSTUV} = f_{RST} * f_{UV} * 10^{-6} = 0.1 * f_{RS} \quad (5)$$

$$C_{out}(P_{opt}) = 11.1 * f_{RS} + 10^4 \quad (6)$$

$$C_{out}(P_{alt,2}) = f_{UV} + f_{TUV} + f_{RS} + f_{RSTUV} \quad (7)$$

$$f_{UV} = 10^6 * 10^4 * 10^{-6} = 10^4 \quad (8)$$

$$f_{TUV} = 10^8 * f_{UV} * 10^{-6} = 10^6 \quad (9)$$

$$f_{RSTUV} = f_{RS} * f_{TUV} * 10^{-7} = 0.1 * f_{RS} \quad (10)$$

$$C_{out}(P_{alt,2}) = 1.1 * f_{RS} + 1.01 * 10^6 \quad (11)$$

Equation 11 for $C_{out}$ represents a Parametric Cost Function (PCF). The PCF represents the cost of a query execution plan (or sub plan) modeled as a function of one or multiple cost parameters.

From $C_{out}$, the PCFs for $C_{out}(P_{opt})$ and $C_{out}(P_{alt,2})$ are linear functions, so the query optimizer may determine their intersection point as follows:

$$C_{out}(P_{opt}) = C_{out}(P_{alt,2}) \quad (12)$$

$$11.1 * f_{RS} + 10^4 = 1.1 * f_{RS} + 1.01 * 10^6 \quad (13)$$

$$f_{RS} = 10^5 \quad (14)$$

The slopes of $P_{opt}$ and $P_{alt,2}$ may be used to determine that $P_{opt}$ is cheaper when $f_{RS}$ is smaller than $10^5$, but when $f_{RS}$ is larger than $10^5$, $P_{alt,2}$ become optimum. For cost functions other than $C_{out}$, there may be non-linear PCFs, which require more effort to calculate one or potentially multiple intersection points between two PCFs. In any case, modeling the costs of plans as PCF and calculating the intersection point of two PCFs may be used to determine optimality ranges.

Table 1 below depicts pseudo-code for a Narrow Range function. Given the PCF of an optimal plan $pcf_{opt}$, the PCF of another plan $pcf_{alt}$, and an optimality range, the Narrow Range (NR) function may return an optimality range with narrower bounds. The NR function calculates the intersection point of $pcf_{opt}$ with $pcf_{alt}$ (line 2 at Table 1). If the intersection point is out of the current optimality range (Table 1 at line 4), then the optimality range could not be narrowed and is returned unmodified (Table 1 at line 5). If the intersection point is in the current optimality range, the NR function can narrow the optimality range. In this case, the NR function may check whether the intersection point restricts the optimality range on the lower or upper end (e.g., it is a new lower or upper bound) (Table 1 at line 8). The NR function may return a more narrow optimality range (Table 1 at lines 9 and 11).

TABLE 1

Narrow Range Function

1: function NARROWRANGE(PCF $pcf_{opt}$, PCF $pcf_{alt}$, Cardinality $f_I^{\downarrow}$, Cardinality $f_I^{\uparrow}$)
2:     $f_I^{intersect} = (pcf_{opt}.b - pcf_{alt}.b)/(pcf_{alt}.a - pcf_{opt}.a)$
3:     // check if intersection point is out of the range
4:     if $f_I^{intersect} < f_I^{\downarrow}$ or $f_I^{intersect} > f_I^{\uparrow}$ then
5:       return $[f_I^{\downarrow}; f_I^{\uparrow}]$
6:     end if
7:     // check if $f_I^{intersect}$ is a new lower or upper bound
8:     if $pcf_{opt}.a < pcf_{alt}.a$ then
9:       return $[f_I^{intersect}; f_I^{\uparrow}]$
10:    else
11:       return $[f_I^{\downarrow}; f_I^{intersect}]$
12:    end if
13: end function In some implementations, an optimal plan(s) container (OPC) may be used. The OPC is a container for PCFs. The OPC may include the lower and upper cardinality bounds. The lower and upper bounds may be initialized by the calculation algorithm with the current optimality range. A PCF may be inserted into an OPC, when there is at least one point between the lower bound and the upper bound where the PCF is optimal. The insertion of a PCF may trigger pruning of other PCFs in the container.

Figure 2:
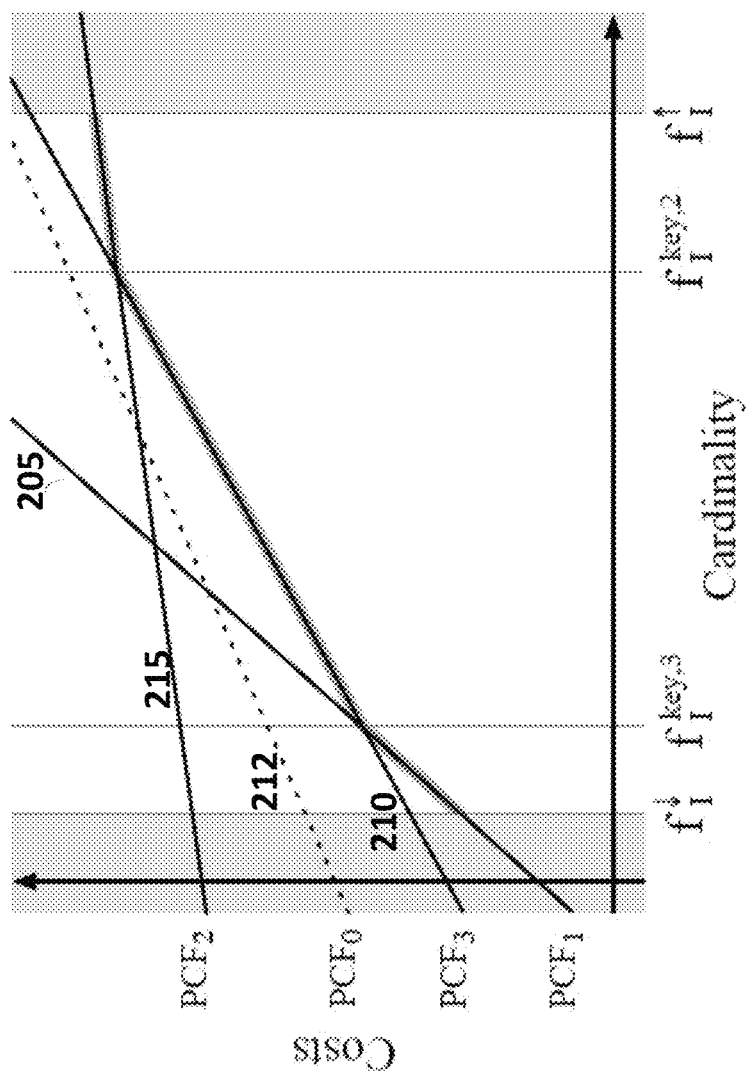
FIG. 2 depicts an example of parametric cost function plots.

FIG. 2 depicts an example of an OPC for linear PCFs 205, 210, 212, and 215, with the cardinality denoted on the x-axis and the costs on the y-axis. In this example, the OPC has the bounds and $f_I^{\downarrow}$ and $f_I^{\uparrow}$ includes three PCFs that are piecewise optimal in the range. Moreover, the $PCF_{0\ 212}$ was in the OPC until the query optimizer pruned $PCF_0$ during the insertion of $PCF_3$ 210.

Table 2 below shows an example of an insertion of a linear PCF $pcf_{new}$ into an OPCopc. The OPC stores each PCF along with the cardinality point from where its plan starts to be optimal. Referring as well to FIG. 2, $PCF_1$ 205 is optimal from $f_I^{key,1} = f_I^{\downarrow}$, $PCF_3$ 210 from $f_I^{key,3}$ and $PCF_2$ 215 from $f_I^{key,2}$. From the data structure point of view, the OPC represents a list of pairs composed of a cardinality point $f_I$ and a PCF (lines 3 and 4 of Table 2). The list may be sorted by the cardinality points. Furthermore, an OPC contains variables for its lower and upper bound, $f_I^{\downarrow}$ and $f_I^{\uparrow}$ (e.g., Table 2 at line 31). The PCF $pcf_{new}$ may only be inserted into pcfs when there is at least one point between $f_I^{\downarrow}$ and $f_I^{\uparrow}$ where it is cheaper than all PCFs in pcfs. Since the PCFs in this example are linear, it is sufficient to only check the corners (e.g., the cardinality points $f_I$). As such, the query optimizer may run over all ordered pairs of cardinality point $f_I$ and PCF pcf in pcfs (Table 2 at line 12). If there is one PCF that is equal to $pcf_{new}$, the query optimizer may immediately return without inserting $pcf_{new}$ (Table 2 at lines 14 to 16). If there is no such case, the query optimizer may store the first and the last cardinality point $f_I$ where $pcf_{new}(f_I)$ is smaller than pc f $(f_I)$ in $f_I^{first}$ and $f_I^{last}$ (Table 2 at lines 18 to 23). After the loop, the query optimizer may determine if (Table 2 at line 26) and where to insert $pcf_{new}$ (Table 2 at lines 30 to 37), update the key of the following entry in pc fs (Table 2 at line 39), and may delete PCFs that got sub-optimal because of $pcf_{new}$ (Table 2 at line 41). Finally, the query optimizer may insert $pcf_{new}$ with its key at the corresponding position in pc f s (Table 2 at line 42).

TABLE 2

Optimal Plans Insertion Container

```
 1: function INSERT(OP opc, PCF pcf_new, bool pruningEnabled)
 2:   // PCFs sorted by point from where they are optimal
 3:   SortedList[Cardinality f_I, PCF pcf] pcfs
 4:   pcfs ← opc.pcfs
 5:   if !pruningEnabled then
 6:     pcfs.insert(0,pcf_new)
 7:     return
 8:   end if
 9:   // run over the entries, check where pcf_new is smaller
10:   Cardinality f_I^first ← ∞
11:   Cardinality f_I^last ← ∞
12:   for each [f_I,pcf] in pcfs do
13:     // immediately return at an existing PCF
14:     if pcf = pcf_new then
15:       return
16:     end if
17:     // check if pcf_new is smaller at f_I
18:     if pcf_new(f_I) ≤ pcf(f_I) then
19:       if f_I^first = ∞ then
20:         f_I^first ← f_I
21:       end if
22:       f_I^last ← f_I
23:     end if
24:   end for
25:   // return if pcf_new was at no point smaller
26:   if f_I^first = ∞ then
27:     return
28:   end if
29:   // determine key f_I^key for pcf_new
30:   Cardinality f_I^key
31:   if f_I^first = opc.f_I^↓ then
32:     // key is opc's lower bound
33:     f_I^key ← opc.f_I^↓
34:   else
35:     // key is intersection with the PCF before f_I^first
36:     f_I^key ← intrset pcf_new,pcfs.at(f_I^first).prev( ))
37:   end if
38:   // uptake key of PCF after f_I^last
39:   pcfs.at(f_I^last).f_I ← intrset(pcf_new,pcfs.at(f_I^last))
40:   // erase PCFs, bounds exclusive
41:   pcfs.eraseFromTo(f_I^first,f_I^last)
42:   pcfs.intsert(f_I^key,pcf_new)
43: end function
```

The pruning of PCFs during the insertion into an OPC may significantly reduce the quantity of enumerated plans during optimality range calculation. Although pruning may be used, in some implementations pruning may be disabled by just inserting PCFs into the container (Table 2 at lines 5 to 8).

The query optimizer may choose which plans are to be compared, when calculating the optimality range for a given edge in an optimal query execution plan. An optimal solution may consist of optimal sub solutions in accordance with Bellman's principle of optimality. To find the optimal query execution plan, dynamic programming query optimizers may not keep only one optimal sub plan, but instead keep additional sub plans that have certain properties such as sorted columns. However, for the sake of a simpler explanation, some of the examples herein assume that only the optimal sub plan is kept. Although some of the examples refer to dynamic programming optimizers, other implementations are possible, such as memorization, transformations, and/or the like. Moreover, in some implementations, the query execution plans (e.g., optimal query execution plan, alternative query execution plans, sub-plans, and/or the linke may be soared in a table, such as a dynamic programming table (also referred to as a MEMO table).

Figure 3:
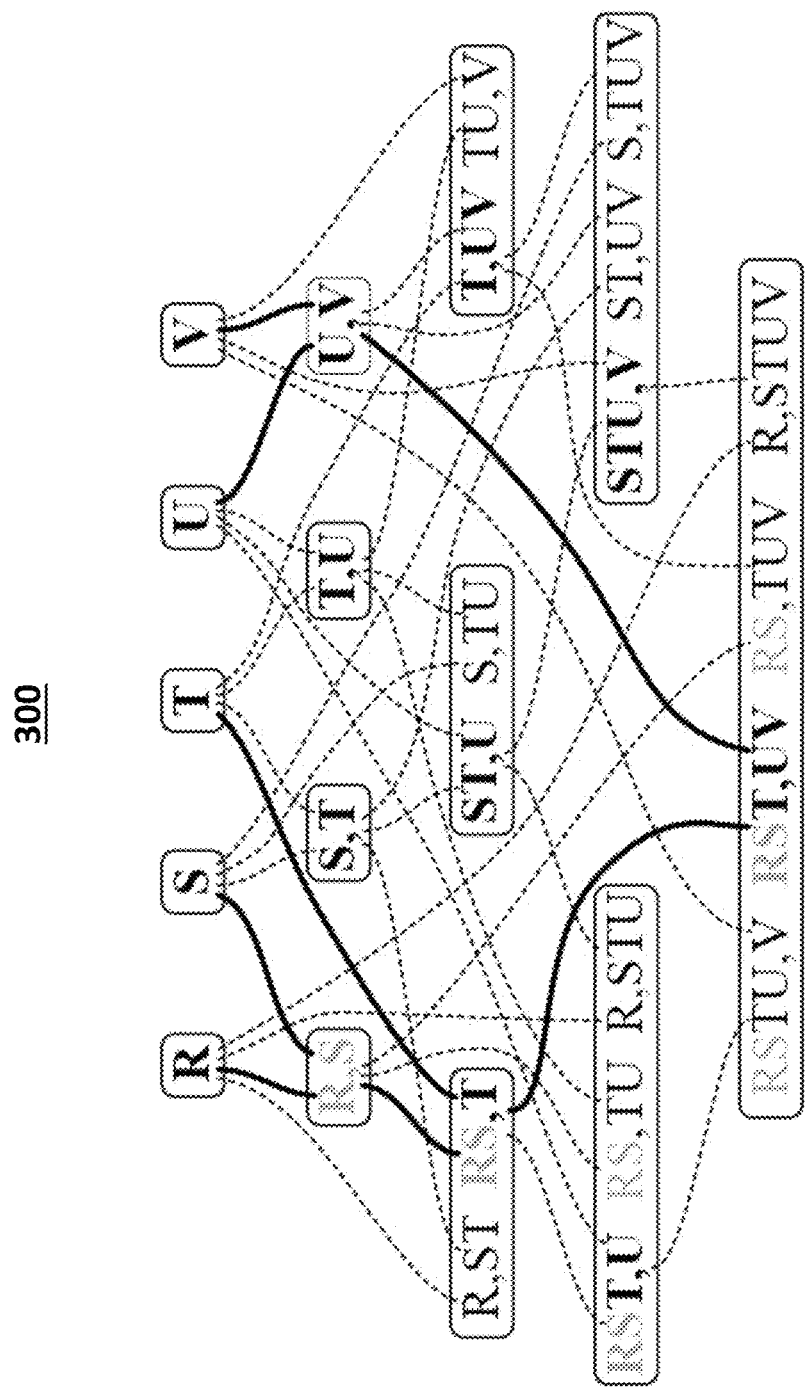
FIG. 3 shows an example of a dynamic programming table.

FIG. 3 shows the dynamic programming table 300 for the example query 100 of FIG. 1. The boxes of FIG. 3 denote different plan classes, which are a set of alternative plans representing the same intermediate result. For example, the plan class RST contains the two alternative plans R, ST and RS, T. For cost functions other than $C_{out}$, there may be more plan alternatives. In the FIG. 3 example, $C_{out}$ may cover only different operator orders (e.g., the logical execution plan). Operator implementations (e.g., hash join vs. sort merge join, and operator input order, i.e., build vs. probe side) may not be covered by $C_{out}$. Other cost functions may be used as well (e.g., a non-linear cost function, a cost function that models the CPU time or I/O requests. and that are not necessarily linear. Further, other operators may be implemented as well including a nested-loop join, a hash join, a sort-merge join (which may result in more alternative plans per plan class), and/or the like.

The different plans in a plan class may have different costs, so that only one of them may be considered optimal (depicted in bold). In the plan class RST for example, the plan RS,T is the optimal plan, which is created out of the optimal plans of the plan classes RS and T. In some implementations, the query optimizer may store only one optimal plan per plan class, and prune more expensive plans (which are not in bold). In the end, FIG. 3 also shows the plan $P_{opt}$ 150 FIG. 1 in solid lines (rather than dashed lines).

As used herein, a dependence plan class (DPC) represents a plan class that is part of the optimal plan. On the DPC's outgoing edge in the optimal plan, the optimality range is calculated. Furthermore, the DPC's output cardinality is a parameter of the PCFs, which are created for the optimality range calculation. Assuming for example, the query optimizer calculates the optimality range of $P_{opt}$ (solid lines at FIG. 3) on the outgoing edge of R ⋈ S. The DPC may be the join RS (e.g., R ⋈ S or RS). The relevant plan classes to consider in this instance are those where RS is a sub plan, i.e., a change in $f_{R⋈S}$ has an impact on the plan choice. For $P_{opt}$ and RS as DPC, those are the plan classes RS, RST, RSTU, and RSTUV. All the other plan classes are independent of $f_{R⋈S}$, and may have consequently constant costs with respect to $f_{R⋈S}$. In general, all plan classes depending on the DPC are relevant, i.e., all plan classes of which the DPC is a sub plan.

In order to compare the costs of different plans, the different plans may need to represent the same intermediate result, so comparing the costs can be only done within the same plan class. Since conventional dynamic programming optimization stores only some optimal plans per plan class, the query optimizer may have re-enumerate plans during the optimality range calculation, although the query optimizer may instead modify the algorithm to store all enumerated alternatives.

In the relevant plan classes (e.g., plan classes that have the DPC as a sub plan), there are three different types of plans: (1) the optimal plan (which depends on the DPC), (2) plans that are not optimal and depend on the DPC, and (3) plans independent of the DPC. To illustrate with respect to FIG. 3, an example of the optimal plan is the RST,U plan in the RSTU plan class, when $P_{opt}$ (solid lines in FIG. 3) with RS as DPC. An example of a plan that is not optimal but depends on the DPC is the RS,TU plan in the RSTU plan class. Lastly, an example of a DPC independent plan is the R, STU plan in the RSTU plan class.

The following provides an example optimality range calculation for one edge in a given optimal query execution plan, although the calculation can be performed for other edges as well. The calculation may be recursive and output a lower bound and an upper bound for the optimality of the plan. Initially, the lower and upper bounds may be set to 0 and ∞, respectively. Portions of the optimal execution plan are compared with corresponding alternatives, and then the optimality range is narrowed.

The following example refers to the query and statistics of FIG. 1 along with the corresponding dynamic programming of FIG. 3. The optimal plan for the example query is $P_{opt}$, which is depicted in FIG. 3 in solid lines. Furthermore, the plan class RS is chosen as the DPC, so the optimality range is calculated on the outgoing edge of R⋈S. The first promising comparison is in the plan class RST, where the sub-optimal plan alternatives are re-enumerated. In the plan class RST, there is the plan RS,T as part of $P_{opt}$ and the plan R, ST that is independent of RS. The question for the query optimizer to answer now is: for which values of $f_{R\bowtie S}$ has R, ST smaller costs than RS,T? To that end, the costs of both plans are modeled as PCF with RS as DPC and then calculate the intersection point as described above. The plan R,ST is independent of RS and therefore has constant cost.

The PCF of R,ST intersects with the PCF of RS,T at $f_{R\bowtie S}=9.1*10^6$. Since this point is inside the current optimality range [$r_{R\bowtie S}=[0:\infty]$, the new lower or upper bound is determined. Application of the Narrow Range function (see, e.g., Table 1) may reveal that the plan RS,T is cheaper until $f_{R\bowtie S}=9.1*10^6$, and plan R,ST beyond that point. Although the example assessed a sub plan as being sub optimal, the optimal plan is thus not optimal anymore when $f_{R\bowtie S}$ becomes larger than $9.1*10^6$. This is due to Bellman's principle of optimality which states that the optimal plan can consist only of optimal sub plans. Consequently, the query optimizer may narrow the current optimality range to $r_{R\bowtie S}=[0; 9.1*10^6]$. With subsequent comparisons, the optimality range may be narrowed further.

In the final plan class RSTUV (for which all non-optimal plan alternatives are re-enumerated), the plan RST,UV as part of $P_{opt}$ is compared with its alternatives. The first alternative is the plan RS,TUV, which is not part of the optimal plan but dependent on the DPC. The costs of RS,TUV and the optimal plan RST,UV are PCF modeled and then the intersection point is calculated. As a result, a new upper bound is obtained and used to update the optimality range to $r_{R\bowtie S}=[0;10^5]$ (see, e.g., Table 1). Another alternative plan is R,STUV (which is independent of the DPC RS and, as such has constant costs). The costs of plan R,STUV are modeled as PCF to enable a calculation of the intersection point with the PCF of our optimal plan RST,UV. In this case, the intersection point is beyond the current upper bound, so it can be ignored (see, e.g., Table 1).

Another interesting plan to compare is RSTU,V, since the plan class RSTU depends on the DPC RS, and there are multiple alternatives for RSTU. The first two alternatives are the plans R, STU and RS,TU. Two additional alternatives result from the plan RST,U, since the plan class RST also depends on the DPC RS. Furthermore, there are two alternatives for RST. In sum, there are four different plan alternatives for the plan RSTU,V that have to be compared with the optimal plan RST,UV. Dynamic programming may not enumerate all four alternatives because of Bellman's principle of optimality. But in order to get the exact optimality range, these alternatives are considered. Only one of the four alternatives intersects with $P_{opt}$ in the current optimality range $r_{R\bowtie S}=[0; 10^5]$, which provides a new lower bound $f^{\downarrow}_{R\bowtie S}=10^3$ (see, e.g., Table 1). Now that all the relevant plans have been considered by the query optimizer, the final optimality range $r_{R\bowtie S}=[10^3; 10^5]$ for the outgoing edge of R⋈S in plan $P_{opt}$ 150 may be determined and annotated as shown at FIG. 1.

As noted above, there may be a need for pruning. When comparing plan alternatives with an optimal plan for example, the query optimizer may not need to enumerate all possible plans of a plan class. To calculate correct optimality ranges, it may be sufficient to enumerate only those plans having sub plans that are somewhere optimal, such as those sub plans that are optimal somewhere within the current optimality range. This may be used as a basis for pruning to reduce the quantity of enumerated plans. Pruning can be used to remove some of the alternative sub plans. Referring to the FIG. 3 plan RSTU,V, pruning may remove three of the four alternatives.

In the case of the OPC noted above, the first OPC may be created for the plan class RSTU, when the plan RSTU,V is supposed to be compared with the optimal plan RST,UV. The OPC for RSTU may be initialized with the current optimality range $r_{R\bowtie S}=[0; 10^5]$, so that it will only contain PCFs that are piecewise optimal in the optimality range. Before the OPC is filled with the PCFs of plans from the plan class RSTU, this process is recursively invoked for the plan class RST,U. This recursion towards the DPC RS stops once the DPC RS is reached. For the plan class RST, both plan alternatives are added to the corresponding OPC (see Table 2), while only the plan RS,T is optimal within the current optimality range. This may be due to the plan class RST being part of the optimal plan, and may be considered in the current optimality range. In the end, this may allow removing the first of the four alternatives for the plan RSTU,V. When the recursion returns from plan class RST to plan class RSTU, the plans may be propagated from the OPC of RST to RSTU, and insert it in the OPC for RSTU (see, e.g., Table 2). The plans RS,TU, and R, STU may be added to the OPC for RSTU. Since they are at no point optimal within the current optimality range, they are ignored (see, e.g., Table 2). This prunes another two of the four alternatives for the plan RSTU,V. In the end, there is only one plan for RSTU,V that has to be compared with the optimal plan RST,UV.

Tables 3-5 below depict pseudo code related to the optimality range calculation. Table 3 starts the recursion by invoking calculation of the optimality range of Table 4 (Table 3 at line 7) on the final plan class (Table 3 at line 3) and returns the final optimality range (Table 3 at line 8). Table 4 compares the optimal plan parts with their alternatives to narrow the optimality range. Table 5 searches all necessary plan alternatives and implements the pruning strategy. A fully optimized plan and the plan table may be populated with one optimal plan per plan class. As query execution plan format, plan nodes may only know their children, so that a plan is just a pointer to the top plan node. Optimality range calculation may also be a recursive algorithm, which starts on the final plan class and traverses the path in the optimal plan to the DPC (which is the recursion base). In the example of FIG. 3, the recursion starts on the plan class RSTUV, continues on plan class RST, and ends in the DPC RS.

TABLE 3

```
1: function STARTCALCRANGE(PlanTable pt, DPC dpc)
2:   // start the recursion on the final plan class
3:   PlanClass finalPc ← pt.finalPlanClass
4:   Cardinality f_I^↓
5:   Cardinality f_I^↑
6:   PCF pcf_opt
7:   [f_I^↓;f_I^↑;pcf_opt] ← calcOptRange(finalPc, dpc)
8:   return [f_I^↓;f_I^↑]
9: end function
```

Table 4 may be considered the main recursive function invoked for every plan class on the path between the final plan class and the DPC. Next to the considered plan class pc, the process depicted at Table 4 also takes the DPC as parameter (Table 4 at line 1). In the recursion base (e.g., pc being equal to dpc), it returns the initial optimality range 0 to ∞ and a PCF for the DPC, which is an identity function (Table 4 at lines 3 to 5). In case we are not in the recursion base (e.g., pc not being equal to dpc), the query optimizer may perform a recursive invocation to the next plan class on the path to the DPC (Table 4 at lines 9 to 12). Returned is the current optimality range and the PCF for the sub plan of the optimal plan (Table 4 at line 12), which is first propagated to the current plan class (Table 4 at line 14) and then used for a comparison with other plan alternatives in this plan class. Next, the query optimizer may re-enumerate all alternative plans for the plan class pc (Table 4 at line 16), and iterate over each alternative plan (Table 4 at line 18). In case a plan is independent of the DPC (Table 4 at line 19), the query optimizer may create a constant cost PCF (line 20), and may invoke the NR function (see, e.g., Table 1) to attempt to narrow the current optimality range (Table 4 at line 21). In case a plan depends on the DPC, the query optimizer may determine the sub plan, i.e., the plan class that contains the DPC, and may invoke the pseudo code in accordance with Table 5 on this plan class (Table 4 at line 26). Table 5 (described further below) may return an OPC with PCFs of relevant plans for the considered plan class to pseudo code of Table 4. Next, the query optimizer may iterate over each PCF in the OPC (Table 4 at line 27), propagate it to the current plan class (Table 4 at line 29), and use the NR function to compare it with the PCF of the optimal plan to further narrow the optimality range (Table 4 at line 30).

While the process of Table 4 may only be invoked for plan classes that are part of the optimal plan, the process represented by Table 5 can be invoked for any plan class that depends on the DPC, such as the plan class RSTU in the example in FIG. 3. The Table 5 process takes the plan class to consider, the DPC, and the current lower and upper bound as parameters (Table 5 at line 1). It returns an OPC (e.g., a set of PCFs that are optimal within the given range). Since the process of Table 5 can be invoked multiple times for a plan class during one optimality range calculation, it is useful to cache the OPC. Initially, there is a check to determine if there is already an OPC cached for this plan class that can be returned (Table 5 at lines 3 to 7). Like the process of Table 4, the Table 5 process also re-enumerates all plan alternatives for the considered plan class (Table 5 at line 16), and loops over each alternative plan (Table 5 at line 18). Plans (which are independent of the DPC) are immediately inserted as constant cost PCF to the OPC (Table 5 at lines 19 to 23). The insertion into an OPC may be in accordance with what was described above with respect to Table 2. For plans depending on the DPC, the sub plan or plan class that contains the DPC is determined (Table 5 at line 24), and recursively invoke the process of Table 5 again (Table 5 at line 25). This recursion ends when the DPC is reached (Table 5 at lines 11 to 14). When the recursive invocation for a plan class returns an OPC (Table 5 at line 25), we loop over each plan in the OPC (Table 5 at line 26), propagate it to the current plan class (Table 5 at line 27), and insert it in the current plan class' OPC (line 28). In the end, the current OPC is cached in the plan class (Table 5 at line 28) and returned (Table 5 at line 32).

TABLE 4

```
 1: function CALCOPTRANGE(PlanClass pc, DPC dpc)
 2:    // recursion base
 3:    if pc = dpc then
 4:       return [0; ∞; PCF(f_I) = f_I]
 5:    end if
 6:    // get the next plan class towards the DPC
 7:    PlanClass nextPc ← getSubPlanToDpc(pc.optPlan,dpc)
 8:    // recursive invocation, traverse to nextPc
 9:    Cardinality $f_I^↓$
10:    Cardinality $f_I^↑$
11:    PCF $pcf_{opt}$
12:    [$f_I^↓$;$f_I^↑$;$pcf_{opt}$] ← calcOptRange(nextPc,dpc)
13:    // propagate $pcf_{opt}$ to the plan class pc
14:    $pcf_{opt}$ ← propagatePcf($pcf_{opt}$,pc.optPlan,nextPc)
15:    // re-enumerate alternative plans in the plan class
16:    List[Plan] alternatives ← pc.reEnumerateAlts( )
17:    // iterate over the alternative plans in the plan class
18:    for each plan in alternatives do
19:       if isPlanIndependentOfDpc(plan,dpc) then
20:          PCF $pcf_{stat}$ ← (plan,costs)
21:          [$f_I^↓$;$f_I^↑$] ← narrowRange($pcf_{opt}$,$pcf_{stat}$,$f_I^↓$,$f_I^↑$)
22:          continue
23:       end if
24:       PlanClass nextPc ← getSubPlanToDpc(plan,dpc)
25:       // get all optimal plans of a sub plan class
26:       OPC tmpOpc ← findAllOptPlans(nextPc,dpc,$f_I^↓$,$f_I^↑$)
27:       for each $pcf_{alt}$ in tmpOpc do
28:          // propagate $pcf_{alt}$ to the plan class pc
29:          $pcf_{alt}$ ← propagatePcf($pcf_{alt}$,plan,nextPc)
30:          [$f_I^↓$;$f_I^↑$] ← narrowRange($pcf_{opt}$,$pcf_{alt}$,$f_I^↓$,$f_I^↑$)
31:       end for
32:    end for
33:    OPC cacheOpc($f_I^↓$,$f_I^↑$)
34:    cacheOpc.insert($pcf_{opt}$)
35:    pc.cacheOpc(cacheOpc)
```

TABLE 4-continued

```
36:    return [$f_I^↓$;$f_I^↑$;$pcf_{opt}$]
37: end function
```

TABLE 5

```
 1: function FINDALLOPTPLANS(PlanClass pc, DPC dpc,
       Cardinality $f_I^↓$,Cardinality $f_I^↑$)
 2:    // check if there is a cached OPC for this plan class
 3:    OPC cachedOpc ← pc.getCachedOpc( )
 4:    if !cachedOpc.empty( ) then
 5:       cachedOpc.updateRanges($f_I^↓$,$f_I^↑$)
 6:       return cachedOpc
 7:    end if
 8:    // create an OPC to return
 9:    OPC opc($f_I^↓$,$f_I^↑$)
10:    // recursion base
11:    if pc = dpc then
12:       insert(opc,PCF($f_I$) = $f_I$, true)
13:       return opc
14:    end if
15:    // re-enumerate alternative plans in the plan class
16:    List[Plan] alternatives ← pc.reEnumerateAlts( )
17:    // iterate over all plans in the plan class
18:    for each plan in alternatives ∪ pc.optPlan do
19:       if isPlanIndependentOfDpc(plan,dpc) then
20:          PCF $pcf_{stat}$ ← (plan.costs)
21:          insert(opc,$pcf_{stat}$,true)
22:          continue
23:       end if
24:       PlanClass nextPc ← getSubPlanToDpc(plan, dpc)
25:       OPC tmpOpc ← findAllOptPlans(nextPc,dpc,$f_I^↓$,$f_I^↑$)
26:       for each $pcf_{alt}$ in tmpOpc do
27:          $pcf_{alt}$ ← propagatePcf($pcf_{alt}$,plan,nextPc)
28:          insert(opc,$pcf_{alt}$,true)
29:       end for
30:    end for
31:    pc.cacheOpc(opc)
32:    return opc
33: end function
```

The process in accordance with the pseudo code of Table 5 may also be invoked on plan classes that were previously considered by the process/pseudo code of Table 4 (e.g., with plan classes on the path between the final plan class and the DPC). For that reason, the Table 4 process may caches an OPC (Table 4 at lines 33 to 35). In contrast to Table 5, the OPC cached by Table 4 may include only one PCF,$pcf_{opt}$. The reason is that Table 4 narrows the current optimality range. Since ranges never become wider, no PCFs except $pcf_{opt}$ can be optimal in the current range.

The following describes a derived, so-called worst case bound for the quantity of enumerated plans required to compute the precise optimality range for a query plan. The query plans may be considered bushy plans, without cross products. Bushy plans may be considered the most complex. Dynamic programming optimizers for instance can find bushy plans, and linear plans may be considered simpler and covered by bushy plans. The number of enumerated plans first of all can depend on the query graph topology. The following describes, for purposes of explanation, chain queries and star queries. Chain queries may be considered a simple query graph topology, while the star queries may have far more plan alternatives than chain queries.

The quantity of enumerated plans for the optimality range calculation also may also depend on the chosen DPC. The deeper the DPC, the more plans may be enumerated. The following example may also be considered a so-called worst case for a DPC, which is a base table plan class. Although the quantity of enumerated plans may, as noted, be reduced by the OPC pruning strategy, the following example does not include pruning as part of the so-called worst case example.

In the case of chain queries, the number of bushy trees without cross products enumerated by dynamic programming for a chain query with n relations is:

$$(n^3-n)/6 \tag{15}$$

For optimality range calculation, only plan classes that depend on the DPC are considered. But in contrast to dynamic programming, all possible plans for a plan class may be enumerated, not only those that consist of optimal sub plans (although pruning may reduce this number, as discussed above).

Figure 4:
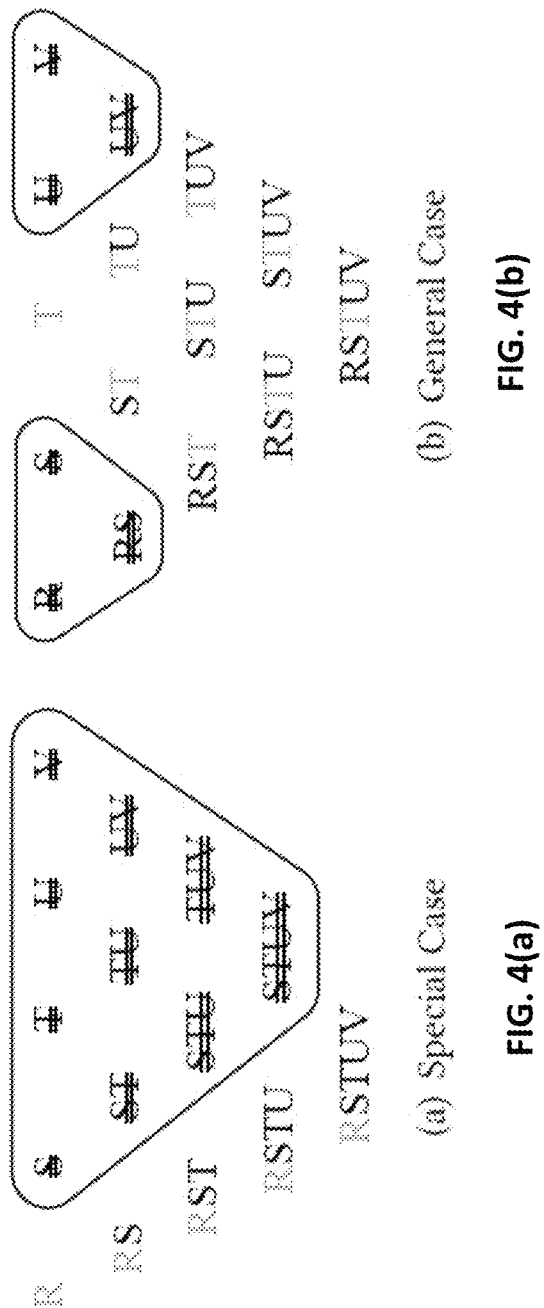
FIGS. 4A and 4B depict examples of bound derivation.

The quantity of all bushy trees without cross products for a chain query with n>1 relations is:

$$2^{n-1}C(n-1) \tag{16}$$

where C(n) are the Catalan numbers. The worst case for the number of enumerated plans may be realized when the DPC is a base table plan class. For chain queries there are two cases. First, the DPC is the plan class of a base table with only one neighbor in the chain query, as shown in FIG. 4(a). Second, the DPC is the plan class of a base table with two neighbors in the chain query, as shown in FIG. 4(b).

FIG. 4(a) indicates how to derive the worst case bound for case 1. The query optimizer may subtract the number of all possible plans for n−1 relations from the number of all possible plans for n relations. This yields the worst case bound for the number of bushy plans without cross products enumerated by optimality range calculation for case 1:

$$2^{n-1}C(n-1)-2^{n-2}C(n-2) \tag{17}$$

Case 2 is the actual worst case for chain queries. Deriving the worst case bound for case 2 is indicated in FIG. 4(b). The query optimizer may subtract the number of all possible plans for m and for k relations from the number of all possible plans for n relations, where m and k are:

$$2^{n-1}C(n-1)-2^{m-1}C(m-1)*2^{k-1}C(k-1) \tag{19}$$

Here, m and k are different numbers for even values of n. This results in the following worst case bound for the number of bushy plans without cross products, enumerated by optimality range calculation for chain queries:

$$2^{n-1}C(n-1)-2^{m-1}C(m-1)*2^{k-1}C(k-1) \tag{19}$$

In the case of star queries, every dimension table may be joined with the fact table (e.g., the center of the star). As a result, each plan class beyond the base table level depends on the fact table. As such, the worst case for the number of enumerated plans for star queries is that the DPC is the fact table plan class. In this case, all plan classes except the other base table plan classes have to be enumerated. This yields a theoretical worst case bound for enumerated bushy (zig-zag) trees without cross products for star queries, which is identical to the number of all possible plans:

$$2^{n-1}(n-1)! \tag{20}$$

The actual number of enumerated bushy plans without cross products for chain and star queries is smaller than the worst case bounds.

Although the examples above refer to linear PCFs, non-linear PCFs may, as noted, be used as well. The use of non-linear PCFs may affect the calculation of the query plan cost intersections with the narrow range algorithm (see, e.g., Table 1) and the OPC (see Table 2). Calculating the intersection point for two nonlinear PCFs may be done numerically, for example using the Newton method (given for example monotonically increasing cost functions). The objective for OPCs stays the same for non-linear PCFs: contain only PCFs that are piecewise optimal in the current optimality range. During the insertion, it still has to be checked if there is at least one point where the new PCF is optimal, and which PCFs in the container became sub-optimal because of the new PCF.

Although some of the example refer to a single optimal plan per plan class, multiple optimal plans per class may be implemented as well. Moreover, although the estimation errors in parallel sub plans was not taken into account in the example above, the estimations errors in parallel sub plans may be taken into account as well. The objective of optimality ranges is to indicate when a query execution plan becomes sub-optimal. This can have multiple reasons, such as transactions modifying the database or estimation errors. Estimation errors can also impact the correctness of the optimality ranges, since optimality ranges are usually calculated based on estimations. Assuming a bushy query execution plan with two parallel sub trees (where one sub tree was executed), the executed sub plan may have a cardinality other than the estimated one (e.g., it could be much smaller, but still in the range). This has an impact on the correctness of the other sub plan's optimality range, which was calculated based on the statistics available before the execution. An option to address this is to define a sequential execution order of operators, and calculate the optimality ranges iteratively based on the latest runtime feedback. Another option is to model the cardinalities of parallel sub plans as parameter in the optimality range, so that the bounds are not just a value but a function. This requires the PCFs to have more than one parameter, and different implementations for plan cost intersection calculation and OPCs.

Although some of the examples herein refer to certain operators such as joins and scans, other operators may be used as well. The cost of a query plan may be modeled as a function of any intermediate result cardinality, so long as the comparisons are of plans with the same or similar logical or physical properties, when narrowing the optimality ranges.

As noted, optimality ranges can be used as a caching strategy for reoccurring queries. After finding the optimal plan for a given query, the query optimizer may calculate the optimality ranges, and may add the plan with ranges to the query cache. Each time a cached query is executed, the real cardinalities for the edges (e.g., the intermediate results) are available. Once a cardinality is out of its optimality range, the cached plan is no longer optimal and evicted from the cache. Due to estimation errors, the cached plan may be sub-optimal, even before its first execution. In this case it would be already evicted from the cache after the first execution. To avoid this behavior, the query optimizer may use Robust Query Processing techniques. The first few executions of a reoccurring query can be used to get runtime feedback, and find a stable plan. This stable plan may be annotated with optimality ranges and added to the query cache.

With respect to parametric queries, Progressive Parametric Query Optimization may refer to an approach for parametric query optimization that avoids searching optimal plans for different parameter combinations at optimization time. It caches optimal plans for already executed parameter combination, called cost point. Cache hits can be either exact matches for a cost point or in a heuristically defined distance to a cost point in the cache. At cache misses, it searches the optimal plan for the cost point and adds it to the cache. This approach can be improved with optimality ranges by storing not only discrete cost points but a range in which a plan is optimal. It allows the storage of fewer plans and enables a more precise plan choice.

The optimality ranges disclosed herein may be used in Mid-Query Re-Optimization to decide if the optimizer should be invoked again with up-to-date statistics to search for a better plan.

Figure 5:
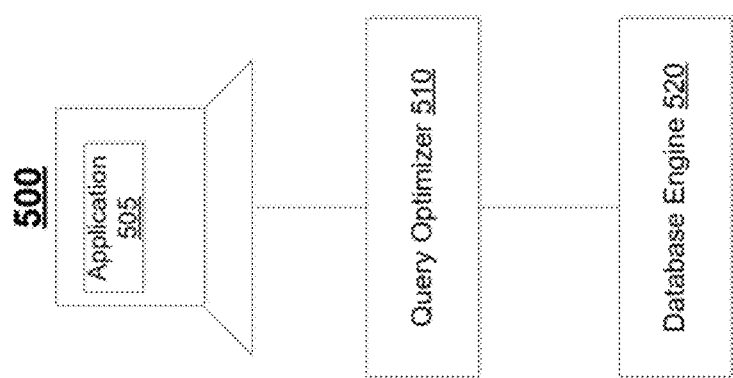
FIG. 5 depicts an example of a system including a query optimizer.

FIG. 5 depicts an example of a system 500, in accordance with some example embodiments. The system 500 may include an application 505 that generates queries for a database engine 520. The database engine 520 may be configured to include, or be coupled to, a database, such as a column store database, a row store database, a multidimensional database, a relational database, and/or the like. In some example embodiments, the query optimizer 510 may be configured to perform one or more operations described herein including those at process 600 and 699. Moreover, the query optimizer may determine optimality ranges for the edges of a query plan and determine whether the currently optimum plan is to continue execution or whether an alternate plan has become optimum.

To illustrate further, an application, such as application 505, may send a query to the database engine 520. The database 520 may invoke the query optimizer to find, based on statistics and/or cardinality estimations, the optimal plan to execute the query. The query optimizer may calculate, for the optimal plan, optimality ranges for one or more edges (which are the points in the query execution plan where intermediate results will be present). The query optimizer may annotate (e.g., store in a table associated with the optimal plan) the calculated optimality ranges. The optimal plan may be executed. During (or after) the execution of the optimal plan, the actual (e.g., true) cardinalities of edges may determine, and these actual cardinalities may be within the bounds of the optimality range or, alternatively, outside the bounds of the optimality range. When the actual cardinality for an edge is within the bounds of the optimality range, the optimal plan execution may continue (and/or the optimal plan may still be considered to be optimal). However, if the actual cardinality is not within (e.g., outside) the optimality range, the optimal plan may be considered to no longer be optimal, the optimal query execution plan may no longer be used for future executions of this query, and/or the query optimizer may be invoked again to search for a better plan for the query.

Figure 6A:
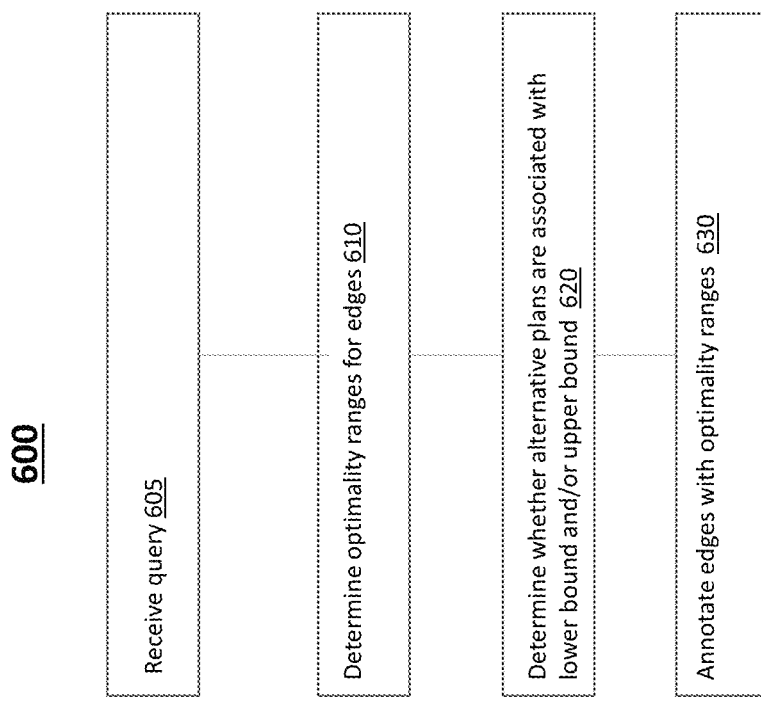
FIGS. 6A-6B depict examples of processes for query optimization.

FIG. 6A depicts a process 600 for annotating edges of a query execution plan with estimated optimality ranges.

At 605, a query execution plan may be received. For example, the query optimizer 510 may receive a query and generate a query execution plan, such as query execution plan 100, 150, and/or the like.

At 610, the query optimizer may determine for one or more edges of the query execution plan optimality ranges estimating the cardinality range of the intermediate result. For example, for the optimal query plan 150, the query optimizer may identify edges 153A-C where intermediate results may be realized later during execution of the query. For each of the edges, the query optimizer may determine optimality ranges defining a lower bound and an upper bound within which the query execution plan is optimal.

At 620, the query optimizer may determine whether a first alternate query execution plan is associate with the lower bound and/or whether a second alternative query execution plan is associated with the upper bound. For example, the query optimizer may identify whether the PCF for the optimal plan crosses/intersects the PCFs of other alternatives plans as described above with respect to FIG. 2. And if so, the other query plans may represent alternative query execution plans which may become optimal during query execution.

At 630, the query optimizer may annotate the optimality ranges at the edge nodes. For example, the query optimizer may annotate for each edge 153A-C of the optimum query execution plan 150 the optimality ranges 156, 152, and 154. This annotation may be kept in a data structure, such as a table, memo, and/or the like.

Figure 6B:
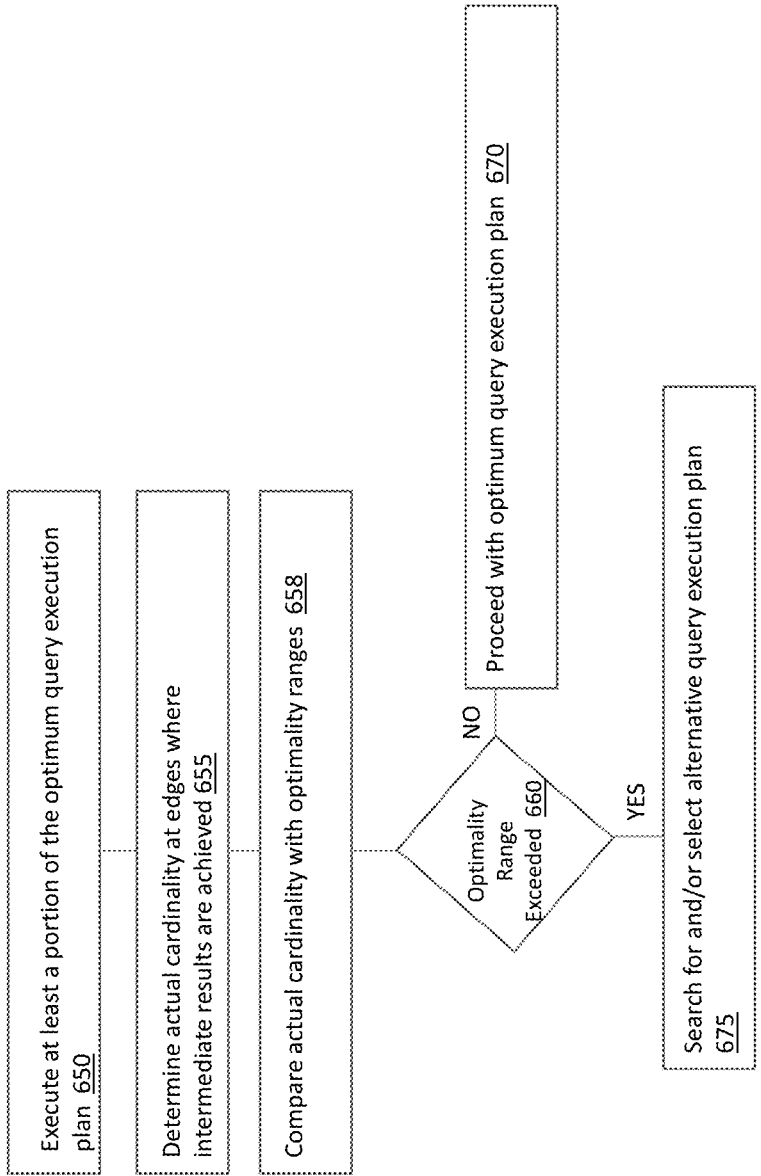

FIG. 6B depicts a process 699 performed during execution of a query plan, such as optimum query plan 150.

At 650, at least a portion of the query plan is executed. For example, at least a portion of the optimum query plan 150 is executed. In the example of FIG. 1, the join of tables R and S may be executed.

At 655, the query optimizer may determine the actual cardinality of the intermediate result for the executed portion. For example, the join of tables R and S may result in an actual cardinality. This actual cardinality may be determined for other edges of the optimum query plan.

At 658, the query optimizer may compare the actual cardinality of the intermediate results and the predetermined optimality ranges determined at process 600, for example. If the actual cardinality is within the optimality range ("NO" at 660), the query execution plan may continue to be executed (670) as the query execution plan, such as plan 150, continues to be optimal during execution.

If the actual cardinality during execution is not with the optimality range ("YES" at 660), the query optimizer may search for another alternative query execution plan (675). For example, the query optimizer may search for other alternative plans, such as plans 160 and 162. The alternative plans may be generated and stored during process 600, so that the alternative plans are available during execution.

Moreover, the optimality ranges may have a first bound mapped to an alternative plan (the lower bound mapped to alternative plan 162. And a second bound mapped to an alternative plan (e.g., the upper bound 156 mapped to alternative plan 160). The alternative plans may be cached. Moreover, the optimality ranges may be stored in a table as noted above.

Process 699 enables a more precise determination of the optimality of a query plan during execution of a query execution plan.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of or "one or more of may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An apparatus, comprising:
   at least one data processor; and
   at least one memory storing instructions which, when executed by the at least one data processor, cause operations comprising:
   executing at least a portion of a query execution plan including an edge node, a first node providing a first input to the edge node, and a second node providing a second input to the edge node, the executing providing, at the edge node, an intermediate result based on the first input provided by the first node and the second input provided by the second node;
   determining a cardinality for the intermediate result at the edge node, rather than determining cardinalities for the first node and the second node;
   proceeding with the execution of the query execution plan, when the determined cardinality is within an optimality range associated with the edge node including the intermediate result; and
   selecting an alternative query execution plan for execution, when the determined cardinality is outside the optimality range associated with the edge node including the intermediate result.

2. The apparatus of claim 1 further comprising:
receiving, at a query optimizer, a query from an application; and
determining, at the query optimizer, the query execution plan for execution at a database.

3. The apparatus of claim 1 further comprising:
estimating, before the executing, the optimality range associated with the edge node.

4. The apparatus of claim 3, wherein the optimality range includes a lower cardinality bound and a higher cardinality bound, wherein the lower cardinality bound and the higher cardinality bound form a range, within which query execution plan remains optimal.

5. The apparatus of claim 4, wherein the lower cardinality bound is mapped to a first alternative query execution plan and the higher cardinality bound is mapped to the second alternative query execution plan, and wherein when the determined cardinality is less than the lower cardinality bound, the query optimizer selects the first alternative query execution plan for execution as an optimal plan, and wherein when the determined cardinality is higher than the higher cardinality bound, the query optimizer selects the second alternative query execution plan for execution as the optimal plan.

6. The apparatus of claim 1, wherein the determined cardinality represents the actual cardinality obtained from execution of at least the edge node that provides the intermediate result, and wherein the optimality range is determined based on a parametric cost function.

7. The apparatus of claim 1, wherein the optimality range and the alternative query execution plan are cached in a table, wherein the determining further comprising calculating a plurality of query execution plans, and wherein a plurality of optimality ranges are determined for a corresponding plurality of edge nodes of the query execution plan.

8. A method comprising:
executing at least a portion of a query execution plan including an edge node, a first node providing a first input to the edge node, and a second node providing a second input to the edge node, the executing providing, at the edge node, an intermediate result based on the first input provided by the first node and the second input provided by the second node;
determining a cardinality for the intermediate result at the edge node, rather than determining cardinalities for the first node and the second node;
proceeding with the execution of the query execution plan, when the determined cardinality is within an optimality range associated with the edge node including the intermediate result; and
selecting an alternative query execution plan for execution, when the determined cardinality is outside the optimality range associated with the edge node including the intermediate result.

9. The method of claim 8 further comprising:
receiving, at a query optimizer, a query from an application; and
determining, at the query optimizer, the query execution plan for execution at a database.

10. The method of claim 8 further comprising:
estimating, before the executing, the optimality range associated with the edge node.

11. The method of claim 10, wherein the optimality range includes a lower cardinality bound and a higher cardinality bound, wherein the lower cardinality bound and the higher cardinality bound form a range, within which query execution plan remains optimal.

12. The method of claim 11, wherein the lower cardinality bound is mapped to a first alternative query execution plan and the higher cardinality bound is mapped to the second alternative query execution plan, and wherein when the determined cardinality is less than the lower cardinality bound, the query optimizer selects the first alternative query execution plan for execution as an optimal plan, and wherein when the determined cardinality is higher than the higher cardinality bound, the query optimizer selects the second alternative query execution plan for execution as the optimal plan.

13. The method of claim 8, wherein the determined cardinality represents the actual cardinality obtained from execution of at least the edge node that provides the intermediate result, and wherein the optimality range is determined based on a parametric cost function.

14. The method of claim 8, wherein the optimality range and the alternative query execution plan are cached in a table, wherein the determining further comprising calculating a plurality of query execution plans, and wherein a plurality of optimality ranges are determined for a corresponding plurality of edge nodes of the query execution plan.

15. A non-transitory computer-readable storage medium including program code which, when executed by the at least one data processor, cause operations comprising:
executing at least a portion of a query execution plan including an edge node, a first node providing a first input to the edge node, and a second node providing a second input to the edge node, the executing providing, at the edge node, an intermediate result based on the first input provided by the first node and the second input provided by the second node;
determining a cardinality for the intermediate result at the edge node, rather than determining cardinalities for the first node and the second node;
proceeding with the execution of the query execution plan, when the determined cardinality is within an optimality range associated with the edge node including the intermediate result; and
selecting an alternative query execution plan for execution, when the determined cardinality is outside the optimality range associated with the edge node including the intermediate result.

16. The non-transitory computer-readable storage medium of claim 15 further causing operations comprising:
receiving, at a query optimizer, a query from an application; and
determining, at the query optimizer, the query execution plan for execution at a database.

17. The non-transitory computer-readable storage medium of claim 15 further causing operations comprising:
estimating, before the executing, the optimality range associated with the edge node.

18. The non-transitory computer-readable storage medium of claim 17, wherein the optimality range includes a lower cardinality bound and a higher cardinality bound, wherein the lower cardinality bound and the higher cardinality bound form a range, within which query execution plan remains optimal.

19. The non-transitory computer-readable storage medium of claim 18, wherein the lower cardinality bound is mapped to a first alternative query execution plan and the higher cardinality bound is mapped to the second alternative query execution plan, and wherein when the determined cardinality is less than the lower cardinality bound, the query optimizer selects the first alternative query execution plan for execution as an optimal plan, and wherein when the determined cardinality is higher than the higher cardinality bound, the query optimizer selects the second alternative query execution plan for execution as the optimal plan.

20. The non-transitory computer-readable storage medium of claim 15, wherein the determined cardinality represents the actual cardinality obtained from execution of at least the edge node that provides the intermediate result, wherein the optimality range is determined based on a parametric cost function, wherein the optimality range and the alternative query execution plan are cached in a table, wherein the determining further comprising calculating a plurality of query execution plans, and wherein a plurality of optimality ranges are determined for a corresponding plurality of edge nodes of the query execution plan.

* * * * *